United States Patent Office 3,178,253
Patented Apr. 13, 1965

3,178,253
METHOD OF DYEING SYNTHETIC FIBERS WHEREIN THE DYESTUFF IS DEVELOPED ON THE FIBER
Julian J. Hirshfeld, Decatur, Ala., assignor to Monsanto Company, a corporation of Delaware
No Drawing. Filed May 22, 1961, Ser. No. 111,442
19 Claims. (Cl. 8—46)

This invention relates to a method for dyeing synthetic fibers. More particularly this invention relates to a method of dyeing fibers or yarns made from the acrylics, polyamides and blends of these synthetic fibers with natural fibers, which involves the formation of colored metallic complexes in these fibers.

A number of methods have been proposed in the past for the dyeing of synethetic fibers, including the acrylic fibers, polyamides and the like. However, many of these methods have turned out to be disadvantageous for a number of reasons. The synthetic fibers dyed by these methods in many instances have proved to have poor lightfastness and/or poor washfastness. Other methods have resulted in products whose chemical properties have been deleteriously affected by the dyeing process.

The simple linear polyamides which are normally insoluble in alcohols but are soluble in phenols are of two types, those derived from polymerizable monoamino-monocarboxylic acids or their amide-forming derivatives and those derived from the reaction of suitable diamines with suitable dicarboxylic acids. On hydrolysis with mineral acids, the polyamides yield monomeric amide-forming reactants. For example, a polyamide derived from a diamine and a dibasic acid yields on hydrolysis with hydrochloric acid the dibasic acid and diamine hydrochloride. Similarly, an amino acid type polyamide yields the corresponding amine-acid hydrochloride. The dyeing process of this invention is applicable to the polycarbonamides of the two above identified types. These polycarbonamides are of the general type disclosed in U.S. Patents 2,071,250, 2,071,253 and 2,130,948. The term polycarbonamide means polymers having recurring units of the formula:

$$-\underset{\underset{R}{|}}{N}-\underset{\underset{O}{\|}}{C}-$$

where R is hydrogen or a monovalent hydrocarbon radical, as integral parts of the main polymer chain, the average number of carbon atoms separating the amide groups being at least two.

In particular, the dyeing process of this invention is applicable to the simple, unsubstituted polyamides such as the polymers formed by the reaction of tetramethylenediamine and adipic acid, tetramethylenediamine with suberic acid, tetramethylenediamine with sebacic acid, hexamethylenediamine with adipic acid, hexamethylenediamine with suberic acid, hexamethylenediamine with sebacic acid. In addition this invention encompasses the polymer formed by the polymerization of the monoamino-monocarboxylic compounds such as 6 amino caproic acid, 7 amino enanthic acid, 8 amino caprylic acid, 9 amino pelargonic acid, 10 amino capric acid, 11 amino n-undecylic acid and 12 amino lauric acid and the polymerization product of the corresponding lactam of the above identified acids. In addition, polymers formed from the reaction of two or more diamines with dicarboxylic acids, and/or two or more dicarboxylic acids with diamines are contemplated, as well as mixed monoaminomonocarboxylic acid polymers. Thus, the word nylon is identified as above for the purpose of this invention and when referred to in the specification encompasses the above.

In addition to the above defined synthetic linear polymers, the dyeing process of this invention is applicable to the acrylics. The acrylics which may be employed in the practice of the present invention, are polyacrylonitrile, copolymers, including binary and ternary polymers containing at least 80 percent by weight of acrylonitrile in the polymer molecule, or a blend comprising acrylonitrile with from 2 to 50 percent of another polymeric material the blend having an overall polymerized acrylonitrile content of at least 80 percent by weight. While the preferred polymers employed in the instant invention are those containing at least 80 percent of acrylonitrile, genrally recognized as the fiber-forming acrylonitrile polymers, it will be understood that the invention is likewise applicable to polymers containing less than 80 percent acrylonitrile. The acrylonitrile polymers containing less than 80 percent acrylonitrile are useful in forming films, coating compositions, molding operations, lacquers, etc., in all of which applications the alleviation of undesirable color is extremely important.

For example, the polymer may be a copolymer of from 80 to 98 percent acrylonitrile and from 2 to 20 percent of another monomer containing the $>$C$=$C$<$ linkage and copolymerizable with acrylonitrile. Suitable mono-olefinic monomers include acrylic, alpha-chloroacrylic and methacrylic acids; the acrylates, such as methylmethacrylate, ethylmethacrylate, butylmethacrylate, methoxymethyl methacrylate, beta-chloroethyl methacrylate and the corresponding esters of acrylic and alpha-chloroacrylic acids; vinyl chloride, vinyl fluoride, vinyl bromide, vinylidene chloride, 1-chloro-1-bromo-ethylene; methacrylonitrile; acrylamide and methacrylamide; alpha-chloroacrylamide; or monoalkyl substitution products thereof; methylvinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; itaconic acid and itaconic ester; N-vinylcarbazole; vinyl furane; alkyl vinyl esters; vinyl sulfonic acid; ethylene alpha, beta-dicarboxylic acids or their anhydrides or derivatives, such as diethylcitraconate, diethylmesaconate, styrene, vinyl naphthalene; vinyl-substituted tertiary heterocyclic amines, such as the vinylpyridines and alkyl-substituted vinylpyridines, for example, 2-vinylpyridine, 4-vinylpyridine, 2-methyl-5-vinylpyridine, etc.; 1-vinylimidazole and alkyl-substituted 1-vinylimidazoles, such as 2-, 4-, or 5-methyl-1-vinylimidazole, and other $>$C$=$C$<$ containing polymerizable materials.

The polymer may be a ternary interpolymer, for example, products obtained by the interpolymerization of acrylonitrile and two of any of the monomers, other than acrylonitrile, enumerated above. More specifically, and preferably, the ternary polymer comprises acrylonitrile, methacrylonitrile, and 2-vinylpyridine. The ternary polymers preferably contain from 80 to 98 percent of acrylonitrile, from 1 to 10 percent of a vinyl-pyridine or a 1-vinylimidazole, and from 1 to 18 percent of another substance such as methacrylonitrile or vinyl chloride.

The polymer may also be a blend of a polyacrylonitrile or of a binary interpolymer of from 80 to 99 percent acrylonitrile and from 1 to 20 percent of at least one other $>$C$=$C$<$ containing substance with from 2 to 50 percent of the weight of the blend of a copolymer of from 10 to 70 percent of acrylonitrile and from 30 to 90 percent of at least one other $>$C$=$C$<$ containing polymerizable monomer. Preferably, when the polymeric material comprises a blend, it will be a blend of a copolymer of 90 to 98 percent acrylonitrile and from 2 to 10 percent of another mono-olefinic monomer, such as vinyl acetate, which is not receptive to dyestuff, with a sufficient amount of a copolymer of from 10 to 70 percent of acrylonitrile and from 30 to 90 percent of a vinyl-substituted tertiary heterocyclic amine, such as vinylpyridine or 1-vinylimidazole, to give a dyeable blend having an overall vinyl-substituted tertiary heterocyclic amine content of from 2 to 10 percent based on the weight of the blend.

Not only does dyeing process of my invention apply to the synthetic fibers alone, but it is also applicable to blends of polyacrylonitrile and wool in the ratio of wool to polyacrylonitrile of from 85–5 to 10–90 with the preferred ratio being 50–50. In addition, this invention will apply to a blend of wool to polyamides in the ratio of 10–90 to 90–10, with the preferred ratio being 50 to 50. Also, a blend of cotton and polyamides will be dyed by the process of this application. The ratio of cotton to polyamides is 5–95 to 95–5 with the preferred ratio being 35–65.

An object of this invention is to provide a method for dyeing acrylic and polyamide fibers.

Another object of this invention is to provide a method for dyeing blends of natural fibers and acrylics or polyamides.

A further object of this invention is to provide a method for dyeing acrylics, polyamides or blends of each with natural fibers, in which the color fully penetrates the fibers resulting in good lightfastness and washfastness.

Other objects of this invention will hereinafter become apparent.

The objects of this invention are accomplished by treating the various fibers with sulfonated derivatives of naphthalene, alpha and beta naphthols and naphthylamine, called intermediates, and then treating the fibers and derivatives with any soluble nitrite and metallic salts, thus resulting in colored complexes being formed in situ. These intermediates are the basic materials for the formation of azo dyestuffs. The colored metallic complexes thus formed fully penetrate the fibers which have good lightfastness and washfastness.

More specifically, the present invention is concerned with the treatment of yarn, for example, made from acrylic or polyamide fibers, in a bath with a ratio of yarn to the bath solution varying from 1–5 to 1–100 with the preferred ratio being 1–40, containing an intermediate in the range of 0.1 percent to 10 percent with the preferred being 3 percent and concentrated sulfuric acid in the range of 0.5 percent to 6 percent with the preferred amount being 3 percent for about 30 to 120 minutes with the preferred time interval being 45 minutes, under boiling conditions. The acid is added to maintain a pH of from 2 to 5 as the acrylics are difficult to dye with acid dyestuffs and the low pH greatly aids the dyeing process. Besides sulfuric acid, nitric acid, hydrochloric acid and any acid which will give a pH of from 2 to 5 may be used. These part-acid dyestuff intermediates dye much more efficiently at this pH. Purely by way of illustration, and not by way of limitation, the intermediates can be any one of 1-naphthylamine-7-sulfonic acid, 1;5-naphthylamine disulfonic acid, 2-naphthol-3,6-disulfonic acid, 2 naphthol-6-sulfonic acid, 6 amino-1-naphthol-3-sulfonic acid, 1-amino-2-naphthol-4-sulfonic acid, 8-amino-1-naphthol-5-sulfonic acid, 6-amino-1,3-naphthalene disulfonic acid, 8-amino-1,3-naphthalene trisulfonic acid, 2-amino-1-naphthalene sulfonic acid, 1-naphthol-4-sulfonic acid, 8-amino-1-naphthol-3;6-disulfonic acid, 4-5-dihydroxy-2, 7-naphthalene disulfonic acid and 8-amino-1-naphthol-5,7-disulfonic acid. After cooling the bath, including the yarn, below 100° F., any nitrite which will give nitroso acid is added in the range of 1.1 percent to 10 percent with the preferred being 3 percent and the yarn is allowed to remain in the cooled bath for 20 to 60 minutes with the preferred being 30 minutes. It is obvious that if the bath were cooled to freezing, the process would not proceed. At this point a slight yellow coloration developed on the yarn. Then a metalic salt is added to the bath and its temperature is raised to boiling and maintained thus for 30 to 90 minutes with the preferred time interval being 45 minutes. The metallic salt is used in a range from 0.1 percent to 10 percent with the preferred amount being 2 percent. With the addition of the metallic salts, an organic acid may be added to maintain the pH in the range of 2 to 5. The inorganic acids added with the intermediate may be used up in the process and additional acids may be needed at this point. Acetic acid, formic acid and others may be used. The metallic salts which can be used in carrying out this invention are ferrous sulfate, cobaltous acetate, nickel sulfate, copper sulfate, chromium acetate, potassium, dichromate, aluminum sulfate, calcium chloride, zinc acetate, stannic chloride, antimony trichloride, cadmium chloride, lead acetate, bismuth nitrate, uranyl acetate and zirconium sulfate. The yarn is then removed from the bath, rinsed and scoured in the usual way and dried.

Various colorations are obtained with various metallic salts in combination with the various intermediates. For example when using 1-naphthylamine-7-sulfonic acid on the acrylics, ferrous sulfate gives an olive green color; cobaltous acetate gives a reddish-brown color, and nickel sulfate gives a light brown color. When using 2-naphthol 3,6-disulfonic acid ferrous sulfate give a light green color, cobaltous acetate gives an orange color, nickel sulfate gives a yellowish-green color, potassium dichromate gives a tannish color, aluminum sulfate gives a light olive green color, calcium chloride gives a light olive green color, zinc acetate gives a yellowish-green color and stannic chloride gives a light tannish-green color. When using 2-naphthol-6-sulfonic acid, ferrous sulfate gives a dark green color, cobaltous acetate gives an orange-reddish color, nickel sulfate gives a light yellowish-tan color, copper sulfate gives a medium brown and chromium acetate gives a dark brown color. When using 1,5 naphthalene disulfonic acid, ferrous sulfate gives a pale yellowish color and cobaltous acetate, nickel sulfate, copper sulfate and chromium acetate all give a slight off shade white. When using 8-amino-1-naphthol-5-sulfonic acid, ferrous sulfate, copper sulfate and cobaltous acetate all give very dark purplish—almost black color. Thus, with various combinations of the intermediates and metallic salts a broad spectrum of colors were obtained from near white to almost black.

The following examples are illustrative rather than limitative and all parts, proportions and percentages are by weight unless otherwise indicated.

*Example I*

Ten grams of carpet yarn made from a polymer containing at least 80 percent acrylonitrile and up to 20 percent of a mono-olefinic monomer copolymerizable therewith, were treated in an equeous bath, with a ratio of yarn to the aqueous bath solution being 1 to 40 with 3 percent of 2-naphthol-6-sulfonic acid and 3 percent concentrated sulfuric acid and heated for 30 minutes under boiling conditions. The aqueous bath was then cooled to less than 100° F. and 3 percent of sodium nitrite dissolved in water was added to the cooled aqueous bath. The yarn was kept in the cooled bath for an additional 20 minutes during which a slight yellow coloration developed in the yarn. Thereafter, 2 percent of ferrous sulfate was added to the aqueous bath and its temperature was raised to the boiling point and maintained for 30 minutes The yarn was then removed, rinsed, scoured in the conventional manner and dried. The coloration of the yarn appeared as a deep green. Analysis of a cross section of a fiber of the yarn disclosed full penetration of the fibers. All percentages indicated above were based on the weight of the yarn.

*Example II*

The process of Example I was repeated exactly except 2 percent of cobaltous acetate was used instead of ferrous sulfate. The yarn was dyed a reddish-rust color. The polymer used here is a blend of 88 percent of a copolymer containing 94 percent acrylonitrile and 6 percent vinyl acetate with 12 percent of a copolymer containing 50 percent acrylonitrile and 50 percent 2-methyl-5-vinylpyridine.

*Example III*

The procedure of Example I was repeated exactly except 2 percent of nickel sulfate was used instead of ferrous sulfate. The yarn was dyed a light brown color.

*Example IV*

The process of Example I was repeated exactly except 2 percent of chromium acetate was used instead of ferrous sulfate. The yarn was dyed a deep brown color.

*Example V*

The process of Example I was repeated exactly except 8-amino-1-naphthol-5-sulfonic acid was used as the intermediate and ferrous sulfate, copper sulfate and cobaltous acetate were each used separately in a dyeing process. All three metallic salts gave a deep navy blue color.

*Example VI*

The process of Example I was repeated exactly except 2-naphthol-3,6-disulfonic acid was used as the intermediate and the metallic salt was ferrous sulfate which resulted in a light green color. Copper sulfate was substituted for ferrous sulfate and it colored the yarn a light brown. Cobaltous acetate was substituted for ferrous sulfate and a very light orange color was developed on the fibers.

*Example VII*

A swatch of 10 grams of yarn made from a polymer, which was composed of the polymerization product of hexamethylenediamine and adipic acid, was treated in an aqueous bath of a ratio of yarn to the aqueous bath of 1 to 40, with 3 percent of 2-naphthol-3,6-disulfonic acid and 3 percent concentrated phosphorus acid and heated for 30 minutes under boiling conditions. The aqueous bath was then cooled to less than 100° F. and 3 percent of sodium nitrite dissolved in water was added to the cooled aqueous bath. The yarn was kept in the cooled bath for an additional 20 minutes. Thereafter, 2 percent of chromium acetate was added to the aqueous bath and its temperature was raised to the boiling point and maintained for 30 minutes. The swatch was then removed, rinsed, scoured in the conventional manner and dried. The coloration of the swatch appeared as a rust-brown. Analysis of a cross section of a fiber from the swatch disclosed full penetration of the fiber. All percentages indicated above were based on the weight of the swatch.

*Example VIII*

The procedure of Example VII was repeated except the intermediate was 2-naphthol-6-sulfonic acid and the metallic salt was copper sulfate. This dyed the swatch a light green.

*Example IX*

A swatch of yarn containing cotton, wool, nylon and a polymer composed of a blend of 88 percent of a copolymer containing approximately 94 percent acrylonitrile and 6 percent vinyl acetate with 12 percent of another copolymer containing 50 percent acrylonitrile and 50 percent 2-methyl-5-vinyl pyridine was subjected to the dyeing process of Example I except copper sulfate was used instead of ferrous sulfate. The various fibers were dyed a green color.

Thus, with the process of this invention, acrylic and polyamide fibers are dyed a broad range of colors with full penetration of the fibers by the dye. This imparts to the dyed fabric a good lightfastness and good washfastness.

It is to be understood that changes and variations may be made in the present invention by a person skilled in the art without departing from the spirit and scope thereof as defined in the appended claims.

I claim:

1. A method of dyeing synthetic fibers comprising treating the fibers in a heated acidic aqueous bath with a substituted, sulfonated naphthalene compound suitable for use as an intermediate for azo dyestuffs, then adding a soluble nitrite and a water soluble metallic salt, removing the fibers from the bath, rinsing, scouring and drying said fibers.

2. A method of dyeing synthetic fibers comprising treating the fibers in an aqueous bath, heated to boiling, at a pH of below 6, adding to the bath a substituted, sulfonated naphthalene compound suitable for use as an intermediate for azo dyestuffs, adding to the bath a soluble alkali metal nitrite and a water soluble metallic salt, removing the fibers from the bath, rinsing, scouring and drying said fibers.

3. A method of dyeing synthetic fibers selected from the group consisting of acrylics, polyamides and blends of said fibers with natural fibers, comprising treating said fibers in a boiling, aqueous bath, with a ratio of fiber to bath solution being 1–5 to 1–100, with a substituted, sulfonated naphthalene compound suitable for use as an intermediate for azo dyestuffs in the range of 0.1 to 10 percent, adding concentrated sulfuric acid in the range of 0.5 percent to 6 percent which gives a pH range of 2 to 5, for a time period of from 30 to 120 minutes, cooling the bath to below 100° F. and maintaining said bath below 100° F. for from 20 to 60 minutes, at the same time adding to the bath a soluble alkali metal nitrite in the range of 1.1 percent to 10 percent, adding a soluble metallic salt in the range of 0.1 percent to 10 percent, raising the temperature of the bath to boiling for from 30 to 90 minutes, removing the fibers from the bath, rinsing, scouring and drying said fibers.

4. A method of dyeing synthetic fibers selected from the group consisting of a polymer formed by a blend of 88 percent of a copolymer containing 94 percent acrylonitrile and 6 percent vinyl acetate with 12 percent of another copolymer containing 50 percent acrylonitrile and 50 percent 2-methyl-5-vinylpyridine, a polymer formed by the polymerization of hexamethylenediamine and adipic acid and blends of the said polymers with natural fibers selected from the group consisting of wool and cotton, comprising treating said fibers in a boiling aqueous bath with a ratio of fiber to both solutions being 1–40 with a substituted, sulfonated naphthalene compound suitable for use as an intermediate for azo dyestuffs selected from the group consisting of 1-naphthylamine-7-sulfonic acid, 1,5-naphthalene disulfonic acid, 2-naphthol-3,6-disulfonic acid, 2-naphthol-6-sulfonic acid, 6-amino-1-naphthol-3-sulfonic acid, 1-amino-2-naphthol-4-sulfonic acid, 8-amino-1-naphthol-5-sulfonic acid, 6-amino-1,3-naphthalene disulfonic acid, 8-amino-1,3,6-naphthalene trisulfonic acid, 2-amino-1-naphthalene sulfonic acid, 4-naphthol-1-sulfonic acid, 8-amino-1-naphthol-3,6-disulfonic acid, 4,5-dihydroxy-2,7-naphthalene disulfonic acid and 8-amino-1-naphthol-5,7-disulfonic acid in the amount of 3 percent, adding concentrated sulfuric acid in the amount of 3 percent giving a pH of 3–4, allowing the bath to boil for 45 minutes, cooling said bath to below 100° F. adding a soluble nitrite selected from the group consisting of sodium nitrite, potassium nitrite, lithium nitrite, rubidium nitrite and cesium nitrite, in the amount of 3 percent, maintaing the bath temperature below 100° F. for 30 minutes, then adding 2 percent of a soluble metallic salt selected from the group consisting of ferrous sulfate, cobaltous acetate, nickel sulfate, copper sulfate, chromium acetate, potassium dichromate, aluminum sulfate, calcium chloride, zinc acetate, stannic chloride, antimony trichloride, cadmium chloride, lead acetate, bismuth nitrate, uranyl acetate and zirconium sulfate, bringing the bath to a boil and maintaining said bath at a boil for 45 minutes, removing the fibers from the bath, rinsing, scouring and drying said fibers.

5. The method of claim 4 in which the fiber is a polymer composed of a blend of 88 percent of a copolymer containing 94 percent acrylonitrile and 6 percent vinyl acetate with 12 percent of another copolymer containing 50 percent acrylonitrile and 50 percent 2-methyl-5-vinylpyridine.

6. The method of claim 4 in which the fiber is the product of the polymerization of hexamethylenediamine and adipic acid.

7. The method of claim 4 in which the fiber is a 50–50 blend of wool and a polymer composed of a blend of 88 percent of a copolymer containing 94 percent acrylonitrile and 6 percent vinyl acetate with 12 percent of another copolymer containing 50 percent acrylonitrile and 50 percent 2-methyl-5-vinylpyridine.

8. The method of claim 5 in which the fiber is a 50–50 blend of wool and the product of the polymerization of hexamethylenediamine and adipic acid.

9. The method of claim 5 in which the substituted, sulfonated naphthalene is 1-naphthylamine-7-sulfonic acid and the soluble metallic salt is ferrous sulfate.

10. The method of claim 5 in which the substituted, sulfonated naphthalene is 1,5-naphthalene-disulfonic acid and the soluble metallic salt is chromium acetate.

11. The method of claim 5 in which the substituted, sulfonated naphthalene is 8-amino-1-naphthol-5-sulfonic acid and the soluble metallic salt is copper sulfate.

12. The method of claim 5 in which the substituted sulfonated naphthalene is 2-naphthol-6-sulfonic acid and the soluble metallic salt is cobaltous acetate.

13. The method of claim 5 in which the substituted, sulfonated naphthalene is 8-amino-1-naphthol-5-sulfonic acid and the soluble metallic salt is potassium dichromate.

14. The method of claim 5 in which the substituted, sulfonated naphthalene is 2-amino-1-naphthalene sulfonic acid and the soluble metallic salt is nickel sulfate.

15. The method of claim 5 in which the substituted, sulfonated naphthalene is 8-amino-1,3,6-naphthalene trisulfonic acid and the soluble metallic salt is aluminum sulfate.

16. The method of claim 5 in which the substituted, sulfonated naphthalene is 2-naphthol-6-sulfonic acid and the soluble metallic salt is stannic chloride.

17. The method of claim 5 in which the substituted, sulfonated naphthalene is 8-amino-1-naphthol-5-sulfonic acid and the soluble metallic salt is calcium chloride.

18. The method of claim 6 in which the substituted, sulfonated naphthalene is 2-naphthol-3,6-disulfonic acid and the soluble metallic salt is chromium acetate.

19. The method of claim 6 in which the substituted, sulfonated naphthalene is 2-naphthol-6-sulfonic acid and the soluble metallic salt is copper sulfate.

References Cited by the Examiner

UNITED STATES PATENTS

| | | | |
|---|---|---|---|
| 2,274,551 | 2/42 | Kenyon et al. | |
| 2,397,454 | 3/46 | Woodward. | |
| 2,726,920 | 12/55 | Federkiel et al. | 8—4 |
| 3,000,298 | 9/61 | Bryant et al. | 8—46 X |
| 3,011,860 | 12/61 | Hirshfeld et al. | 8—55 |

OTHER REFERENCES

Venkataraman: "The Chemistry of Synthetic Dyes," vol. 1, 1952, Academic Press Inc., publishers, N.Y., page 212.

NORMAN G. TORCHIN, *Primary Examiner.*

MORRIS O. WOLK, ABRAHAM H. WINKELSTEIN,
*Examiners.*